US009893620B2

United States Patent
Ikeda et al.

(10) Patent No.: US 9,893,620 B2
(45) Date of Patent: Feb. 13, 2018

(54) CONTROL APPARATUS AND CONTROL METHOD FOR DC/DC CONVERTER CAPABLE OF BIDIRECTIONAL POWER TRANSFER

(71) Applicant: Mitsubishi Electric Corporation, Tokyo (JP)

(72) Inventors: Matahiko Ikeda, Tokyo (JP); Mai Uenaka, Tokyo (JP); Yuta Komatsu, Tokyo (JP); Ryota Kondo, Tokyo (JP); Masaru Kobayashi, Tokyo (JP); Nobuhiro Kihara, Tokyo (JP); Naoki Moritake, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/259,688

(22) Filed: Sep. 8, 2016

(65) Prior Publication Data

US 2017/0271989 A1    Sep. 21, 2017

(30) Foreign Application Priority Data

Mar. 17, 2016    (JP) .................................. 2016-053869

(51) Int. Cl.
| | | |
|---|---|---|
| *H02M 3/158* | (2006.01) | |
| *H02M 1/08* | (2006.01) | |
| *H02M 1/14* | (2006.01) | |
| *H02M 1/00* | (2006.01) | |

(52) U.S. Cl.
CPC ............. *H02M 3/158* (2013.01); *H02M 1/08* (2013.01); *H02M 1/14* (2013.01); *H02M 3/1584* (2013.01); *H02M 2001/0009* (2013.01)

(58) Field of Classification Search
CPC ...... H02M 3/158; H02M 3/1584; H02M 1/08; H02M 1/14; H02M 2001/0009
See application file for complete search history.

(56) References Cited

FOREIGN PATENT DOCUMENTS

| | | | | |
|---|---|---|---|---|
| JP | 2004208367 A | | 7/2004 | |
| JP | 2007295701 A | * | 11/2007 | .......... H02M 3/1584 |
| JP | 2010-068611 A | | 3/2010 | |
| JP | 2011-193693 A | | 9/2011 | |
| JP | 2013-115894 A | | 6/2013 | |
| WO | 2012014912 A1 | | 2/2012 | |

OTHER PUBLICATIONS

Communication dated Feb. 21, 2017, from the Japanese Patent Office in counterpart application No. 2016-053869.

* cited by examiner

*Primary Examiner* — Jue Zhang
*Assistant Examiner* — Jye-June Lee
(74) *Attorney, Agent, or Firm* — Sughrue Mion, PLLC; Richard C. Turner

(57) ABSTRACT

An object of this invention is to obtain a control apparatus and a control method for a DC/DC converter, with which a DC/DC converter can be controlled with superior stability and responsiveness while reducing the size of a storage medium. A calculation value is calculated in accordance with a specific control method using a differential voltage between a target output voltage and an output voltage, whereupon a control calculation value is calculated from the calculation value and an input voltage.

10 Claims, 13 Drawing Sheets

CONTROL APPARATUS AND CONTROL METHOD FOR DC/DC CONVERTER CAPABLE OF BIDIRECTIONAL POWER TRANSFER

BACKGROUND OF THE INVENTION

1. Field of the Invention

This invention relates to a control apparatus and a control method for a DC/DC converter, which are used to control a DC/DC converter.

2. Description of the Related Art

A DC/DC converter capable of bidirectional power transfer is available in the prior art. This type of DC/DC converter performs a power running operation in which a voltage of direct current power input from a direct current power supply such as a battery is converted and the converted power is supplied to a motor, and a regenerative operation in which direct current power generated by the motor is supplied to the direct current power supply, and is used in various applications such as hybrid vehicles and electric vehicles.

A voltage between the DC/DC converter and the motor, or in other words an output voltage, is controlled by the DC/DC converter, but the output voltage may deviate from a target voltage for various reasons, such as rapid variation in the target voltage and load variation in the motor. Therefore, a DC/DC converter that can make the output voltage follow the target voltage with a high degree of responsiveness when a deviation occurs between the target voltage and the output voltage by adjusting a gain used during output voltage feedback control has been proposed (see Japanese Patent Application Publication No. 2011-193693, for example).

SUMMARY OF THE INVENTION

In an application where the voltage of the direct current power input from the direct current power supply, or in other words an input voltage, and the target voltage are used in a wide range, amounts of variation in a control operation amount and the output voltage of the DC/DC converter differ according to the respective voltage values of the input voltage and the target voltage.

The prior art described in Japanese Patent Application Publication No. 2011-193693, meanwhile, is configured in consideration of the fact that when control is performed using a fixed gain, the responsiveness varies in accordance with individual voltage conditions. More specifically, to obtain an equal degree of responsiveness during control of the output voltage, a gain map on which the gain is associated with the individual voltage conditions is prepared, and the gain is selected using the gain map.

When the voltage use range of the DC/DC converter is wide, however, a large-scale storage device is required to store the gains. In this case, either a load exerted on a storage medium or a size of the storage medium must be increased during digital control, while during analogue control, a mounting surface area must be increased.

This invention has been designed to solve the problem described above, and an object thereof is to obtain a control apparatus and a control method for a DC/DC converter, with which a DC/DC converter can be controlled with superior stability and responsiveness while reducing the size of a storage medium.

A control apparatus for a DC/DC converter according to this invention is applied to a DC/DC converter having a power conversion circuit that includes a reactor connected at one end to a direct current power supply and a switching circuit configured to include a plurality of switching elements and connected to another end of the reactor, and that converts an input voltage input from the direct current power supply and outputs the converted input voltage as an output voltage, a low voltage side voltage detector that detects and outputs the input voltage, and a high voltage side voltage detector that detects and outputs the output voltage. The control apparatus performs control using a control calculation value to switch the plurality of switching elements ON and OFF, and includes a controller that calculates and outputs a first calculation value in accordance with a specific control method using, as input, a differential voltage between a target output voltage and the output voltage output from the high voltage side voltage detector, and a calculator that calculates the control calculation value from the first calculation value output from the controller and the input voltage output from the low voltage side voltage detector.

Further, a control method for a DC/DC converter according to this invention is applied to a DC/DC converter having a power conversion circuit that includes a reactor connected at one end to a direct current power supply and a switching circuit configured to include a plurality of switching elements and connected to another end of the reactor, and that converts an input voltage input from the direct current power supply and outputs the converted input voltage as an output voltage, a low voltage side voltage detector that detects and outputs the input voltage, and a high voltage side voltage detector that detects and outputs the output voltage. In the control method, control is performed using a control calculation value to switch the plurality of switching elements ON and OFF, and the control method includes the steps of calculating a first calculation value in accordance with a specific control method using, as input, a differential voltage between a target output voltage and the output voltage output from the high voltage side voltage detector, and calculating the control calculation value from the first calculation value and the input voltage output from the low voltage side voltage detector.

According to this invention, it is possible to obtain a control apparatus and a control method for a DC/DC converter, with which a DC/DC converter can be controlled with superior stability and responsiveness while reducing the size of a storage medium.

DESCRIPTION OF THE PREFERRED EMBODIMENTS

Figure 1:
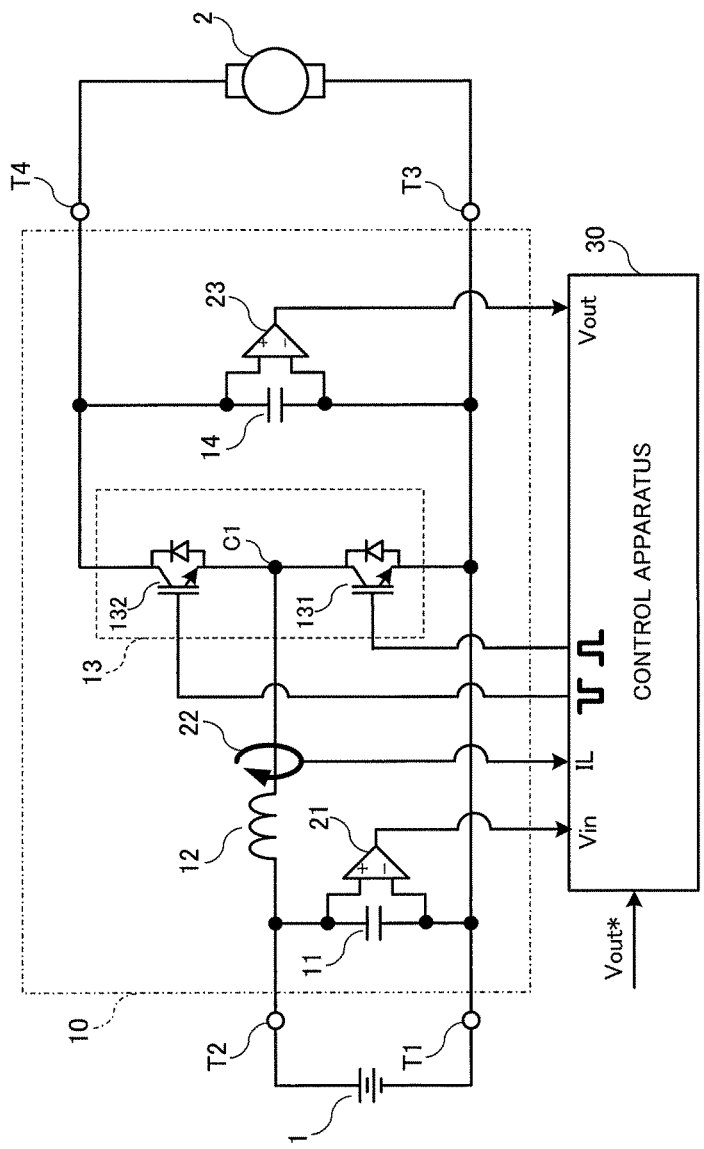
FIG. 1 is a view showing a configuration of a DC/DC converter system according to a first embodiment of this invention.

Preferred embodiments of a control apparatus and control method for a DC/DC converter according to this invention will be described below using the drawings. Note that in the drawings, identical or corresponding parts have been allocated identical reference numerals, and duplicate description thereof has been omitted.

First Embodiment

FIG. 1 is a view showing a configuration of a DC/DC converter system according to a first embodiment of this invention. The DC/DC converter system shown in FIG. 1 includes a DC/DC converter having a power conversion circuit 10, a low voltage side voltage detector 21, a current detector 22, and a high voltage side voltage detector 23, and a DC/DC converter control apparatus 30 (abbreviated to control apparatus 30 hereafter). Note that FIG. 1 also shows a battery 1 connected to a low voltage side of the power conversion circuit 10, and a motor 2 connected to a high voltage side of the power conversion circuit 10.

The power conversion circuit 10 is a bidirectional power conversion circuit capable of bidirectional power conversion between the low voltage side and the high voltage side. A terminal T1 and a terminal T2 are provided on an input side of the power conversion circuit 10 as low voltage side terminals, while a terminal T3 and a terminal T4 are provided on an output side of the power conversion circuit 10 as high voltage side terminals.

The power conversion circuit 10 boosts a direct current input voltage Vin input between the terminal T1 and the terminal T2 to a voltage equaling or exceeding the input voltage Vin, and outputs a boosted output voltage Vout between the terminal T3 and the terminal T4.

The battery 1 serves as an example of a direct current power supply, and is connected between the terminal T1 and the terminal T2. The motor 2 is connected between the terminal T3 and the terminal T4.

The power conversion circuit 10 includes a low voltage side smoothing capacitor 11, a reactor 12, a switching circuit 13, and a high voltage side smoothing capacitor 14. The switching circuit 13 is configured to include a first switching element 131 and a second switching element 132 connected in series with the first switching element 131.

The low voltage side smoothing capacitor 11 functions to smooth the input voltage Vin, and is connected at one end to the terminal T1 and at another end to the terminal T2. The terminal T1 and the terminal T3 have common connections. Note that a single terminal may be used as both the terminal T1 and the terminal T3.

The reactor 12 is connected at one end to the battery 1 and at another end to the switching circuit 13. More specifically, the reactor 12 functions to store energy, and is connected at one end to the terminal T2 and at the other end to a connection portion C1 between the first switching element 131 and the second switching element 132.

The first switching element 131 is controlled to switch ON and OFF in accordance with a gate signal G1 to be described below.

Similarly, the second switching element 132 is controlled to switch ON and OFF in accordance with a gate signal G2 to be described below.

Note that a combination of an insulated gate bipolar transistor (IGBT) that switches ON when the gate signal is High and an anti-parallel diode, for example, is used as the first switching element 131 and the second switching element 132.

The first switching element 131 is connected at one end to the connection portion C1 and at another end to the terminal T1. The second switching element 132 is connected at one end to the connection portion C1 and at another end to the terminal T4.

More specifically, an emitter terminal of the first switching element 131 is connected to the terminal T1, and a collector terminal of the second switching element 132 is connected to the terminal T4. A collector terminal of the first switching element 131 and an emitter terminal of the second switching element 132 are connected to the connection portion C1. The connection portion C1 is connected to the terminal T2 via the reactor 12.

Hence, the power conversion circuit 10 includes the reactor 12 connected at one end to the battery 1, and the switching circuit 13 configured to include the plurality of switching elements 131, 132 and connected to the other end of the reactor 12. Further, the power conversion circuit 10 converts the input voltage Vin input from the battery 1, and outputs the converted input voltage Vin as the output voltage Vout.

The low voltage side voltage detector 21 detects an inter-terminal voltage of the low voltage side smoothing capacitor 11 as the input voltage Vin, and outputs the detected input voltage Vin to the control apparatus 30. Hence, the low voltage side voltage detector 21 detects and outputs the input voltage Vin.

The current detector 22 detects a current flowing through the reactor 12 as a reactor current IL, and outputs the detected reactor current IL to the control apparatus 30. Hence, the current detector 22 detects and outputs the reactor current IL flowing through the reactor 12.

The high voltage side voltage detector 23 detects an inter-terminal voltage of the high voltage side smoothing capacitor 14 as the output voltage Vout, and outputs the detected output voltage Vout to the control apparatus 30. Hence, the high voltage side voltage detector 23 detects and outputs the output voltage Vout.

The control apparatus 30 implements overall control of the DC/DC converter system, and is realized by a microcomputer or the like configured to execute a program stored in a memory, for example.

The control apparatus 30 performs control to switch the first switching element 131 and the second switching element 132 ON and OFF using a control calculation value to be described below. More specifically, the control apparatus 30 generates the gate signal G1 for the first switching element 131 and the gate signal G2 for the second switching element 132 in accordance with respective detection values obtained by the low voltage side voltage detector 21, the current detector 22, and the high voltage side voltage detector 23.

Figure 2:
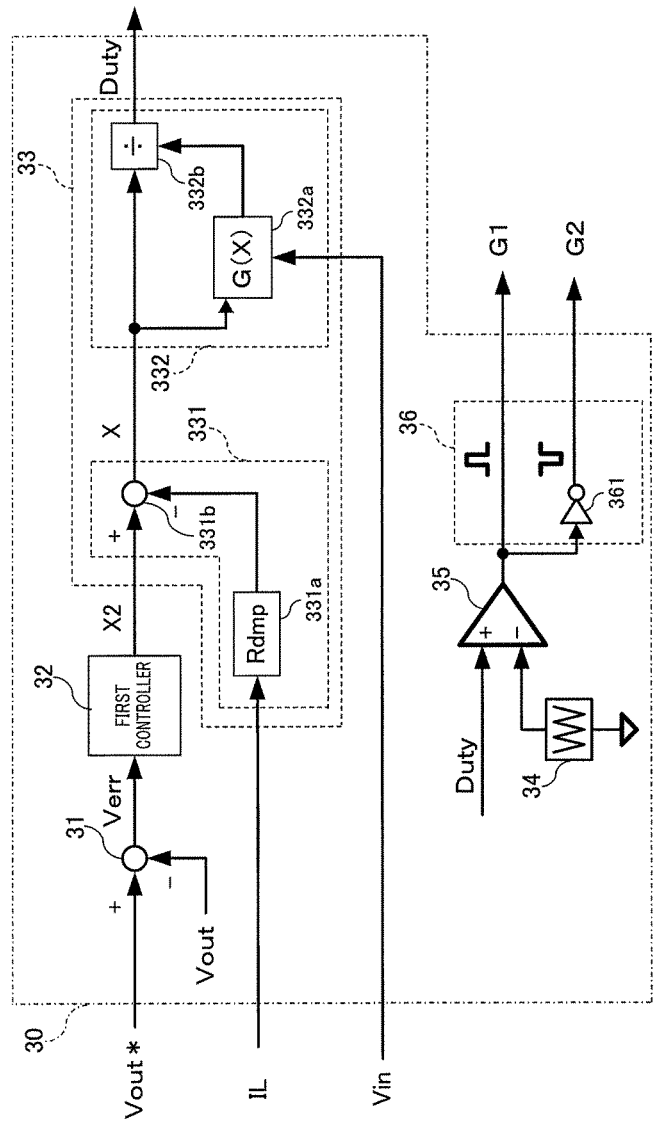
FIG. 2 is a view showing a configuration of a control apparatus for a DC/DC converter according to the first embodiment of this invention.

Next, a configuration of the control apparatus 30 will be described with reference to FIG. 2. FIG. 2 is a view showing the configuration of the control apparatus 30 for a DC/DC converter according to the first embodiment of this invention. The control apparatus 30 shown in FIG. 2 includes a subtractor 31, a first controller 32, a calculator 33, a triangular waveform generator 34, a comparator 35, and a gate signal outputter 36.

An externally determined target output voltage Vout* is input into the control apparatus 30. The subtractor 31 calculates a difference between the input target output voltage Vout* and the output voltage Vout input from the high voltage side voltage detector 23 as a differential voltage Verr, and outputs the calculated differential voltage Verr to the first controller 32.

The first controller 32 calculates a calculation value X2 using the differential voltage Verr as input in accordance with a specific control method such as PI control, P control, PD control, or PID control, and outputs the calculated calculation value X2 to the calculator 33.

Hence, the first controller 32 calculates and outputs the calculation value X2 in accordance with a specific control method using, as input, the differential voltage Verr between the target output voltage Vout* and the output voltage Vout input from the high voltage side voltage detector 23.

Note that in the first embodiment, a case in which PI control is used as the specific control method will be described as an example. In this case, the first controller 32 amplifies the differential voltage Verr using a setting gain, and outputs the amplified differential voltage Verr as the calculation value X2.

The calculator 33 includes a resonance suppression unit 331 having a multiplier 331a and a subtractor 331b, and a gain normalization unit 332 having a gain comparator 332a and a divider 332b.

The multiplier 331a of the resonance suppression unit 331 multiplies the reactor current IL input from the current detector 22 by a set damping constant Rdmp, and outputs a resulting multiplication value to the subtractor 331b. The subtractor 331b calculates a difference between the calculation value X2 input from the first controller 32 and the multiplication value input from the multiplier 331a, and outputs a resulting calculation value to the gain normalization unit 332 as a calculation value X.

In other words, the resonance suppression unit 331 calculates the calculation value X from the input calculation value X2 and reactor current IL by performing calculation processing shown below in Equation (1), and outputs the resulting calculation value X to the gain normalization unit 332.

[Math. 1]
$$X = X2 - IL \times Rdmp \quad (1)$$

Note that in the configuration described as an example in the first embodiment, the reactor current IL is multiplied by the set constant Rdmp, but a configuration in which the reactor current IL is not multiplied by the set constant Rdmp may be employed instead. In this case, the calculation value X corresponds to a difference between the calculation value X2 output from the first controller 32 and the reactor current IL output from the current detector 22.

The gain comparator 332a of the gain normalization unit 332 calculates a calculation value G(X) from the calculation value X input from the subtractor 331b and the input voltage Vin input from the low voltage side voltage detector 21 by performing calculation processing shown below in Equation (2), and outputs the resulting calculation value G(X) to the divider 332b.

[Math. 2]
$$G(X) = X + Vin \quad (2)$$

The divider 332b outputs a value obtained by dividing the calculation value X input from the subtractor 331b by the calculation value G(X) input from the gain comparator 332a as a control calculation value. Note that in the first embodiment, a case in which Duty is output as the control calculation value and input into the comparator 35 will be described as an example.

In the case described as an example in the first embodiment, the control apparatus 30 includes the resonance suppression unit 331, but the control apparatus 30 does not have to include the resonance suppression unit 331. In this case, the calculation value G(X) corresponds to a sum of the calculation value X2 output from the first controller 32 and the input voltage Vin output from the low voltage side voltage detector 21. Further, the control calculation value is a value obtained by dividing the calculation value X2 output from the first controller 32 by the calculation value G(X).

The triangular waveform generator 34 generates a triangular waveform having a specific period, and outputs the generated triangular waveform to the comparator 35. The comparator 35 generates a pulse waveform by comparing Duty input from the gain normalization unit 332 with the triangular waveform input from the triangular waveform generator 34. Note that in the case described as an example in the first embodiment, a triangular waveform is used as a carrier wave, but a sawtooth wave may be used as the carrier wave instead.

The pulse waveform output from the comparator 35 forms the gate signal G1 as is on one side of the gate signal outputter 36, and passes through an inverter 361 on another side of the gate signal outputter 36 so as to form the gate signal G2, which has a complementary relationship to the gate signal G1. The gate signal outputter 36 outputs the generated gate signals G1 and G2.

The control apparatus 30 modifies Duty by performing feedback control on the output voltage Vout in the manner described above in order to correct deviations from an ideal state, such as loss caused by a resistance component of the circuit and an error in an actual ON period caused by a signal delays in the gate signal. Hence, by employing PI control, PID control, or the like as the control method of the first controller 32 in a steady state, the output voltage Vout can be made to follow the target output voltage Vout*.

Next, amounts of variation in the output voltage Vout and the reactor current IL when Duty is adjusted by the control apparatus 30 will be described.

In an ideal state where Duty calculated by the control apparatus 30 is reflected as is in the respective ON periods of the switching elements 131, 132, an ON ratio of the first switching element 131 corresponds to Duty, and an ON ratio of the second switching element 132 corresponds to (1−Duty).

Here, when an amount of current flowing toward the motor 2 is set as Io, a capacitance of the high voltage side smoothing capacitor 14 is set as Co, and an inductance of the reactor 12 is set as L, a state-space averaging equation of the power conversion circuit 10 may be expressed as shown below in Equation (3).

[Math. 3]

$$\frac{d}{dt}\begin{bmatrix} Vout \\ IL \end{bmatrix} = \begin{bmatrix} 0 & \frac{1-\text{Duty}}{Co} \\ -\frac{1-\text{Duty}}{L} & 0 \end{bmatrix} \begin{bmatrix} Vout \\ IL \end{bmatrix} + \begin{bmatrix} -\frac{Io}{Co} \\ \frac{Vin}{L} \end{bmatrix} \quad (3)$$

Note that when Equation (3) is expressed in the form of variation from an average value using microscopic fluctuations (i.e. when Equation (3) is linearized), Equation (4), shown below, is obtained. In Equation (4), parameters marked with a tilde (~) sign denote microscopic fluctuations, while parameters marked with a bar (-) sign denote average state values.

[Math. 4]

$$\frac{d}{dt}\begin{bmatrix} \tilde{V}out \\ \tilde{I}L \end{bmatrix} = \begin{bmatrix} 0 & \frac{1-\overline{\text{Duty}}}{Co} \\ -\frac{1-\overline{\text{Duty}}}{L} & 0 \end{bmatrix} \begin{bmatrix} \tilde{V}out \\ \tilde{I}L \end{bmatrix} + \begin{bmatrix} -\frac{\overline{IL}}{Co} \\ \frac{\overline{Vout}}{L} \end{bmatrix} \tilde{\text{Duty}} + \begin{bmatrix} -\frac{\tilde{I}o}{Co} \\ \frac{\tilde{V}in}{L} \end{bmatrix} \begin{bmatrix} \tilde{I}o \\ \tilde{V}in \end{bmatrix} \quad (4)$$

When a Laplace transform is implemented with respect to the linearized state equation of Equation (4), a transfer function of the output voltage Vout and the reactor current IL relative to the operation amount Duty is obtained as shown below in Equation (5) and Equation (6), where

[Math. 5]

$$\omega 0 = \frac{1-\overline{D}}{\sqrt{LCo}}$$

[Math. 6]

$$\frac{\tilde{V}out}{\tilde{\text{Duty}}} = \frac{1}{(1-\overline{\text{Duty}})^2} \frac{\overline{Vin} - sL\overline{IL}}{\left(\frac{s}{\omega 0}\right)^2 + 1} \quad (5)$$

$$\frac{\tilde{I}L}{\tilde{\text{Duty}}} = \frac{1}{(1-\overline{\text{Duty}})^2} \frac{sCo\overline{Vout} + (1-\overline{\text{Duty}})\overline{IL}}{\left(\frac{s}{\omega 0}\right)^2 + 1}. \quad (6)$$

As is evident from the transfer function of Equation (5), when a desired output voltage Vout is output to the motor 2 from the input voltage Vin obtained from the battery 1 by adjusting the respective ON ratios of the switching elements 131, 132, or in other words Duty, differences occur in a Duty variation amount and a Vout variation amount depending on the average states of the input voltage Vin, the output voltage Vout, and Duty.

Next, a difference occurring in a transfer characteristic of the power conversion circuit 10, as shown in Equation (5), when the average value of the input voltage Vin differs will be described with reference to FIGS. 3A and 3B. Further, a difference occurring in the transfer characteristic of the power conversion circuit 10, as shown in Equation (5), when the average value of the output voltage Vout differs will be described with reference to FIGS. 4A and 4B.

Figure 3A:
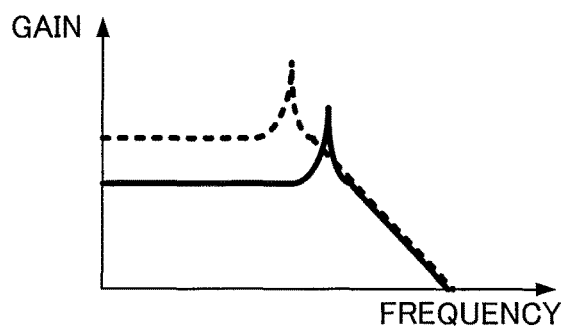
FIG. 3A is a gain characteristic diagram showing a transfer characteristic of a power conversion circuit according to the first embodiment of this invention.
Figure 3B:
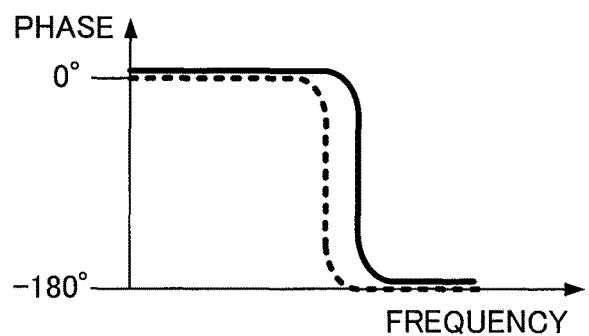
FIG. 3B is a phase characteristic diagram showing the transfer characteristic of the power conversion circuit according to the first embodiment of this invention.
Figure 4A:
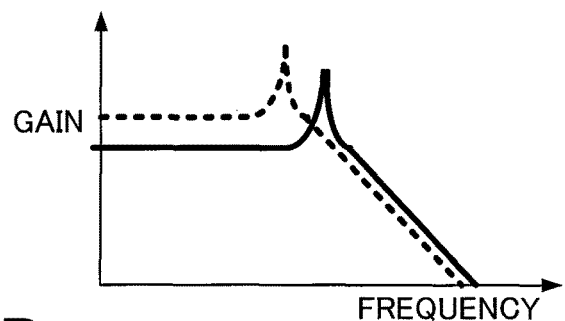
FIG. 4A is a gain characteristic diagram showing the transfer characteristic of the power conversion circuit according to the first embodiment of this invention.
Figure 4B:
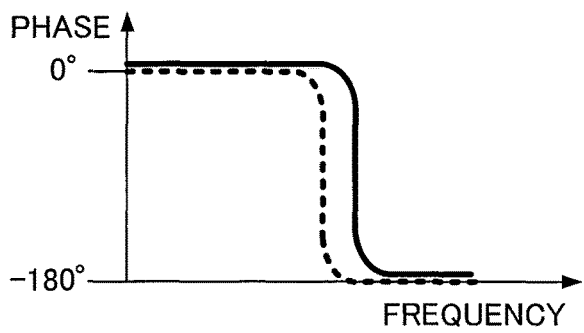
FIG. 4B is a phase characteristic diagram showing the transfer characteristic of the power conversion circuit according to the first embodiment of this invention.

FIGS. 3A and 4A are gain characteristic diagrams showing the transfer characteristic of the power conversion circuit 10 according to the first embodiment of this invention. FIGS. 3B and 4B are phase characteristic diagrams showing the transfer characteristic of the power conversion circuit 10 according to the first embodiment of this invention.

Note that in FIGS. 3A and 3B, solid lines and dotted lines indicate differences in the average value of the input voltage Vin, wherein FIG. 3A is a gain plot corresponding to the solid line and the dotted line, and FIG. 3B is a phase plot corresponding to the solid line and the dotted line. Further, in FIGS. 4A and 4B, solid lines and dotted lines indicate differences in the average value of the output voltage Vout, wherein FIG. 4A is a gain plot corresponding to the solid line and the dotted line, while FIG. 4B is a phase plot corresponding to the solid line and the dotted line.

Here, a case in which a battery voltage varies in accordance with a charging rate of the battery 1 such that the input voltage Vin is applied at various values will be described as a specific example of a case in which the average value of the input voltage Vin differs. Further, a case in which the target output voltage Vout* is input into the control apparatus 30 at various values as an optimum target output voltage Vout* corresponding to torque and rotation speed efficiency characteristics of the motor 2 will be described as a specific example of a case in which the average value of the output voltage Vout differs.

When the average value of the input voltage Vin and the average value of the output voltage Vout vary in this manner, a difference occurs in the output voltage Vout (with the tilde), which varies with respect to an identical operation amount Duty (with the tilde). Further, the gain characteristic and the phase characteristic vary in accordance with the average value of Duty as well as the respective average values of the input voltage Vin and the output voltage Vout such that when the power conversion circuit 10 is an ideal state, Duty, Vout, and Vin have a relationship expressed by Equation (7). Therefore, when the average value of Duty differs, a similar gain characteristic to those of FIGS. 3A and 4A and a similar phase characteristic to those of FIGS. 3B and 4B are obtained.

[Math. 7]

$$1 - \overline{D}\text{uty} = \frac{\overline{V}in}{\overline{V}out} \quad (7)$$

Next, a transfer characteristic of the gain normalization unit 332 and the power conversion circuit 10, which is obtained by multiplying a transfer characteristic of the gain normalization unit 332 by the transfer characteristic of the power conversion circuit 10, will be described with reference to FIGS. 5A and 5B.

Figure 5A:
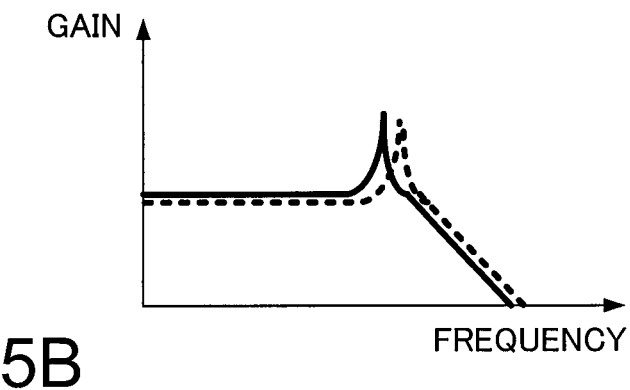
FIG. 5A is a gain characteristic diagram showing a transfer characteristic of a gain normalization unit and the power conversion circuit according to the first embodiment of this invention.
Figure 5B:
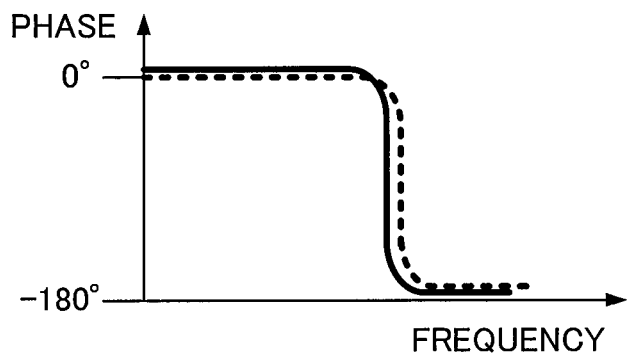
FIG. 5B is a phase characteristic diagram showing the transfer characteristic of the gain normalization unit and the power conversion circuit according to the first embodiment of this invention.

FIG. 5A is a gain characteristic diagram showing the transfer characteristic of the gain normalization unit 332 and the power conversion circuit 10 according to the first embodiment of this invention. FIG. 5B is a phase characteristic diagram showing the transfer characteristic of the gain normalization unit 332 and the power conversion circuit 10 according to the first embodiment of this invention.

When a transfer function of the gain normalization unit 332 is multiplied by the transfer function of the power conversion circuit 10, shown in Equation (5), a transfer function of the output voltage Vout relative to the calculation value X is obtained. In this case, the transfer function of the output voltage Vout relative to the calculation value X is as shown below in Equation (8), while FIGS. 5A and 5B respectively show a gain characteristic diagram and a phase characteristic diagram corresponding to this transfer function.

[Math. 8]

$$\frac{\tilde{V}out}{\tilde{X}} = \frac{(1-\overline{D}\text{uty})^2}{\overline{V}in} \frac{1}{(1-\overline{D}\text{uty})^2} \frac{\overline{V}in - sL\overline{I}L}{\left(\frac{s}{\omega 0}\right)^2 + 1} \quad (8)$$

$$= \frac{1}{\left(\frac{s}{\omega 0}\right)^2 + 1} - \frac{1}{\overline{V}in} \cdot \frac{sL\overline{I}L}{\left(\frac{s}{\omega 0}\right)^2 + 1}$$

Figure 6:
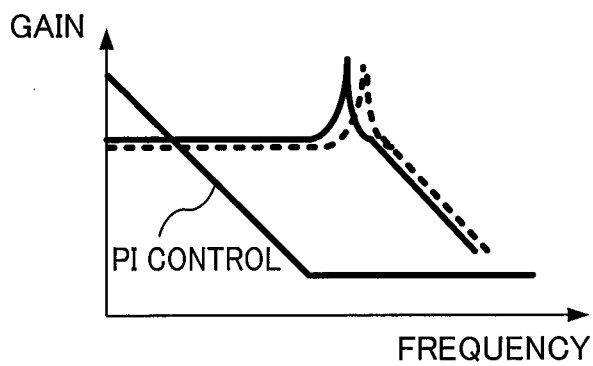
FIG. 6 is a gain characteristic diagram illustrating a design method employed in a case where PI control is used as a control method by a first controller according to the first embodiment of this invention.

At a differing input voltage and a differing output voltage, a gain at or below an LC resonance frequency becomes even at a peak point of the gain. Next, a design method employed in a case where the transfer characteristic of the gain normalization unit 332 and the power conversion circuit 10 is subjected to control and PI control is used as the control method of the first controller 32 will be described with reference to FIG. 6. FIG. 6 is a gain characteristic diagram illustrating a design method employed in a case where PI control is used as the control method of the first controller 32 according to the first embodiment of this invention.

As shown in FIG. 6, the gain is even at or below the resonance point, and therefore a crossover frequency of the PI control performed by the first controller 32 is set at a frequency no higher than a resonance point of the control subject power conversion circuit 10. By setting the crossover frequency in this manner, stability can be secured. Furthermore, to secure responsiveness, the crossover frequency of the PI control is set at a maximum frequency at which stability can be secured.

Hence, the control apparatus 30 is configured to include the gain normalization unit 332 as a constituent element of the control apparatus 30 for controlling the original control subject power conversion circuit 10. In other words, in the first embodiment, the calculation result obtained by the first controller 32 is normalized using the detected input voltage Vin, and as a result, the combined transfer characteristic of the power conversion circuit 10 and the gain normalization unit 332 becomes constant at or below the resonance frequency.

Hence, the first controller 32 can secure stability and responsiveness using an identical control gain under any input voltage and output voltage conditions.

Note that when the control apparatus 30 does not include the gain normalization unit 332 that serves as a feature of this invention, individual control gains must be stored in the first controller 32 for each voltage condition in order to secure stability and responsiveness under any input voltage and output voltage conditions.

When, on the other hand, the control apparatus 30 includes the gain normalization unit 332, as in this invention, individual control gains do not have to be stored in accordance with the input voltage and the output voltage, and therefore a storage medium used during digital control can be reduced in size.

Further, an optimum control gain does not have to be set in accordance with the input voltage and output voltage, and therefore a number of design processes required to obtain the optimum gain can be reduced. Moreover, the individual control gains do not have to be switched in accordance with the input voltage and the output voltage, and therefore operation verifications performed during a control gain switch can be reduced, and hysteresis does not have to be provided during a switch.

Figure 7A:
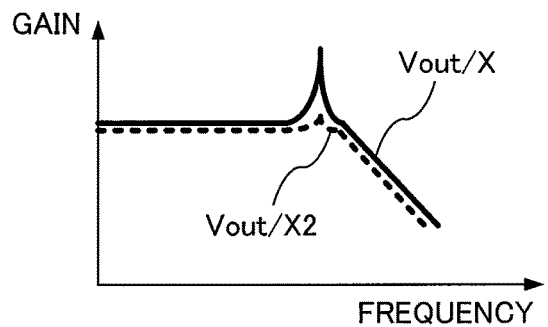
FIG. 7A is a gain characteristic diagram illustrating an effect of a resonance suppression unit according to the first embodiment of this invention.
Figure 7B:
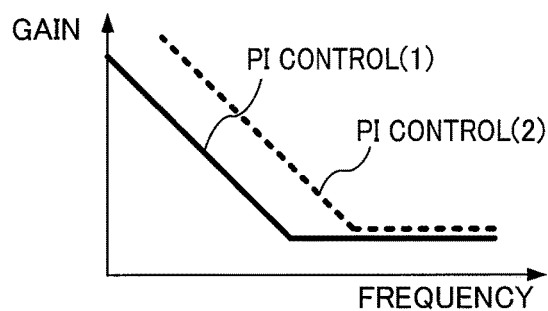
FIG. 7B is a gain characteristic diagram illustrating an effect of the resonance suppression unit according to the first embodiment of this invention.

Next, effects obtained when the control apparatus 30 is configured to include the resonance suppression unit 331 will be described with reference to FIGS. 7A and 7B. FIGS. 7A and 7B are gain characteristic diagrams illustrating the effects of the resonance suppression unit 331 according to the first embodiment of this invention.

Note that in FIG. 7A, a solid line denotes a gain characteristic corresponding to the transfer characteristic of the output voltage Vout relative to the calculation value X, while a dotted line denotes a gain characteristic corresponding to the transfer characteristic of the output voltage Vout relative to the calculation value X2. Further, in FIG. 7B, a solid line denotes PI control (1) corresponding to the solid line in FIG. 7A, while a dotted line denotes PI control (2) corresponding to the dotted line in FIG. 7A.

Equation (6), which represents the transfer function of IL relative to Duty, likewise exhibits a transfer characteristic according to which the peak point of the gain appears at the LC resonance point, and therefore the gain peak at the LC resonance point is lowered by the resonance suppression unit 331 by subtracting the characteristic shown in Equation (6). At this time, the set constant Rdmp that is multiplied by the reactor current IL by the multiplier 331a is a value set in consideration of the stability of the reactor current IL. Hence, the gain peak at the resonance point can be suppressed.

When PI control is used by the first controller 32, the crossover frequency is set as in PI control (1), shown in FIG. 7B, with respect to Vout/X, which corresponds to a case in which the resonance suppression unit 331 is not provided. With respect to Vout/X2, which corresponds to a case in which the resonance suppression unit 331 is provided, on the other hand, the control can be set such that the calculations are performed quickly, as in PI control (2) shown in FIG. 7B, and as a result, an improvement in the responsiveness of the control is achieved.

Figure 8:
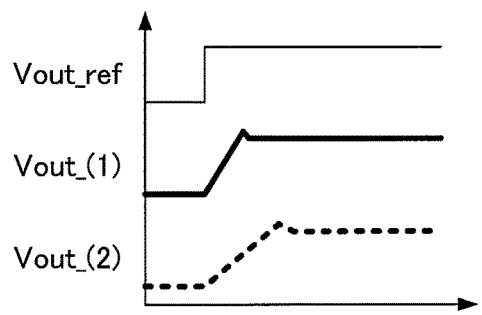
FIG. 8 is a voltage waveform diagram showing voltage variation in a conventional DC/DC converter serving as a comparative example of the DC/DC converter according to the first embodiment of this invention.

Next, effects of the DC/DC converter according to the first embodiment will be described with reference to FIGS. 8 and 9. FIG. 8 is a voltage waveform diagram showing voltage variation in a conventional DC/DC converter serving as a comparative example of the DC/DC converter according to the first embodiment of this invention, and FIG. 9 is a voltage waveform diagram showing voltage variation in the DC/DC converter according to the first embodiment of this invention.

Figure 9:
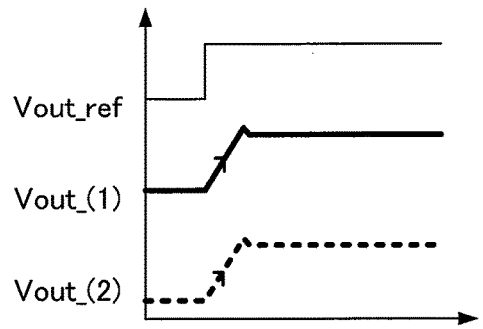
FIG. 9 is a voltage waveform diagram showing voltage variation in the DC/DC converter according to the first embodiment of this invention.

Note that the voltage waveform diagrams of FIGS. 8 and 9 show a following waveform of the output voltage Vout accompanying step-form variation in the target output voltage Vout* (illustrated as Vout_ref in the drawings) under conditions (1) and (2), respectively. Conditions (1) and (2) denote different conditions of the input voltage Vin.

As shown in FIG. 8, in a conventional DC/DC converter controlled by a control apparatus that does not include the gain normalization unit 332, a difference in the time required for the output voltage Vout to follow Vout_ref, or in other words the responsiveness, occurs between an output voltage Vout_(1) under condition (1) and an output voltage Vout_(2) under condition (2).

As shown in FIG. 9, on the other hand, in a DC/DC converter controlled by the control apparatus 30 according to the first embodiment, the time required for the output voltage Vout to follow Vout_ref, or in other words the responsiveness, is aligned between the output voltage Vout_(1) under condition (1) and the output voltage Vout_(2) under condition (2).

According to the first embodiment, as described above, a configuration in which the first calculation value X2 is calculated in accordance with a specific control method using, as input, the differential voltage Verr between the target output voltage Vout* and the output voltage Vout output from the high voltage side voltage detector, whereupon the control calculation value is calculated from the first calculation value X2 and the input voltage Vin output from the low voltage side voltage detector, is provided as a first configuration.

With this configuration, control can be performed on the DC/DC converter with superior stability and responsiveness while reducing the size of a storage medium. In other words, since a gain map is not required, a storage medium of the control apparatus can be reduced in size, and moreover, a DC/DC converter that exhibits superior stability and responsiveness regardless of the conditions of the input voltage and the output voltage can be realized.

Further, a configuration in which an added value is calculated by adding the first calculation value X2 to the input voltage Vin output from the low voltage side voltage detector, whereupon a value obtained by dividing the first calculation value X2 by the added value is calculated as the control calculation value, is provided in relation to the first configuration, described above, as a second configuration.

With this configuration, a gain at or below the resonance point on a Bode plot showing the transfer characteristic of the power conversion circuit can be made even, and as a result, control can be performed using a fixed control gain with respect to a differing input voltage and a differing output voltage.

Furthermore, a configuration in which a value obtained by subtracting the reactor current IL output from the current detector from the first calculation value X2 is calculated as the second calculation value X, an added value is calculated by adding the second calculation value X to the input voltage Vin output from the low voltage side voltage detector, and a value obtained by dividing the second calculation value X by the added value is calculated as the control calculation value, is provided in relation to the first configuration, described above, as a third configuration.

With this configuration, a phenomenon whereby oscillation becomes steadily more likely to occur as the reactor current increases can be suppressed.

Moreover, a configuration in which a value obtained by subtracting a value that is obtained by multiplying the set constant Rdmp by the reactor current IL output from the current detector from the first calculation valve X2 is calculated as the second calculation value X, an added value is calculated by adding the second calculation value X to the input voltage Vin output from the low voltage side voltage detector, and a value obtained by dividing the second calculation value X by the added value is calculated as the control calculation value, is provided in relation to the first configuration, described above, as a fourth configuration.

With this configuration, the phenomenon described above can be suppressed, and since the set damping constant Rdmp is multiplied by the reactor current IL, stability can be secured likewise with respect to a resonance suppression level.

Second Embodiment

The control apparatus 30 according to a second embodiment of this invention controls a DC/DC converter in which the power conversion circuit 10 is configured differently to the power conversion circuit 10 of the first embodiment. Note that in the second embodiment, points that are similar to the first embodiment will not be described, and instead, the following description focuses on points that differ from the first embodiment.

In the second embodiment, the gain and phase characteristic diagrams showing the transfer characteristic of the power conversion circuit 10 are similar to FIGS. 3A to 4B of the first embodiment. Further, the gain and phase characteristic diagrams showing the transfer characteristic of the gain normalization unit 332 and the power conversion circuit 10 are similar to FIGS. 5A and 5B of the first embodiment. Furthermore, the voltage waveform diagram showing voltage variation in the DC/DC converter is similar to FIG. 9 of the first embodiment.

Figure 10:
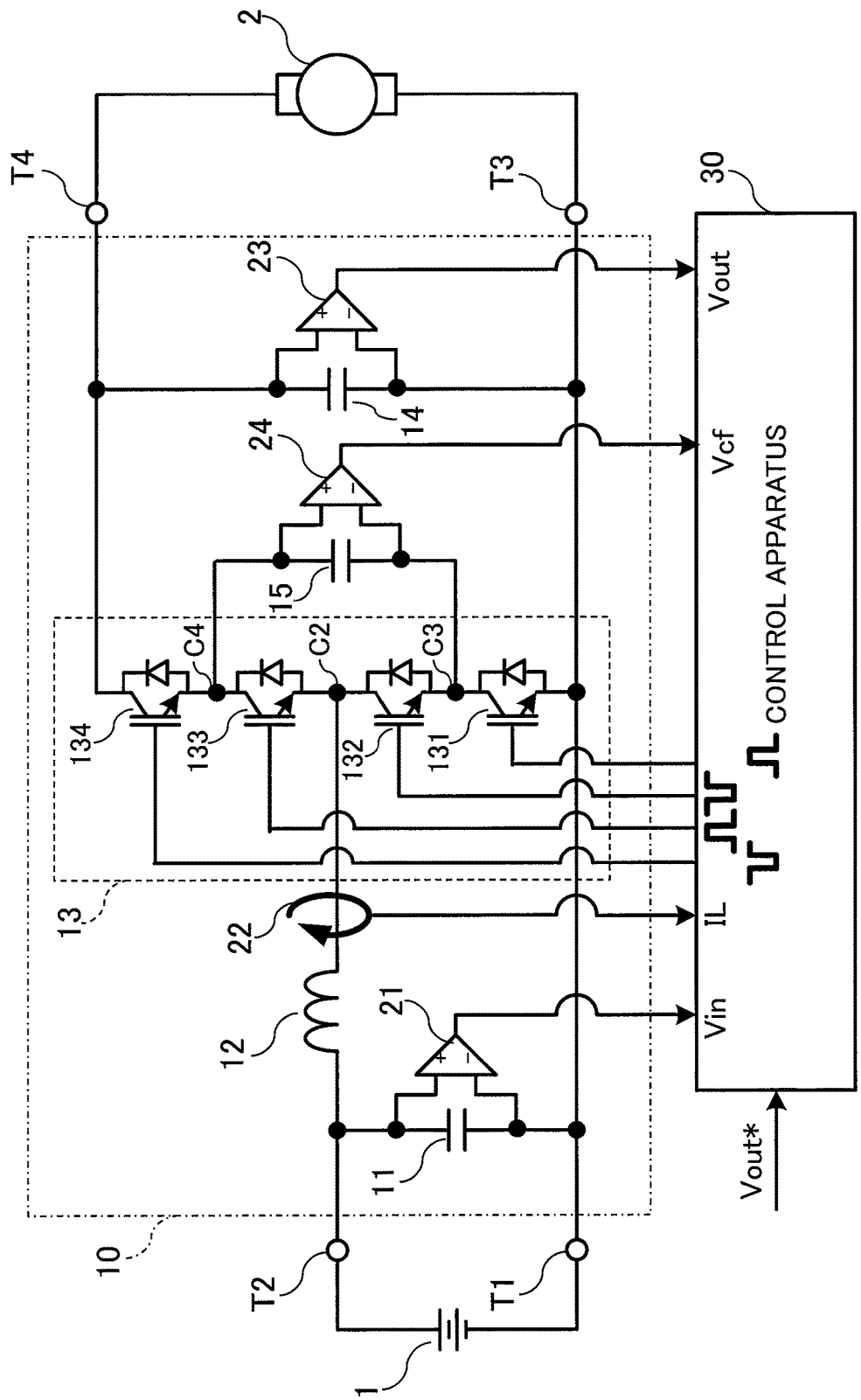
FIG. 10 is a view showing a configuration of a DC/DC converter system according to a second embodiment of this invention.

FIG. 10 is a view showing a configuration of a DC/DC converter system according to the second embodiment of this invention. The DC/DC converter system shown in FIG. 10 includes a DC/DC converter having the power conversion circuit 10, the low voltage side voltage detector 21, the current detector 22, the high voltage side voltage detector 23, and a voltage detector 24, and the control apparatus 30.

The power conversion circuit 10 includes the low voltage side smoothing capacitor 11, the reactor 12, the switching circuit 13, the high voltage side smoothing capacitor 14, and a charging/discharging capacitor 15.

The switching circuit 13 is configured to include the first switching element 131, the second switching element 132 connected in series with the first switching element 131, a third switching element 133 connected in series with the second switching element 132, and a fourth switching element 134 connected in series with the third switching element 133.

The reactor 12 is connected at one end to the terminal T2, and at the other end to a connection portion C2 between the second switching element 132 and the third switching element 133.

The charging/discharging capacitor 15 functions to halve the voltage applied to the reactor 12, and is connected at one end to a connection portion C3 between the first switching element 131 and the second switching element 132 and at another end to a connection portion C4 between the third switching element 133 and the fourth switching element 134.

Hence, the power conversion circuit 10 according to the second embodiment includes the charging/discharging capacitor 15 that is connected in parallel with the second switching element 132 and the third switching element 133, which are connected in series.

The first switching element 131 is controlled to switch ON and OFF in accordance with the gate signal G1 to be described below. Similarly, the second switching element 132 is controlled to switch ON and OFF in accordance with the gate signal G2 to be described below. Likewise, the third switching element 133 is controlled to switch ON and OFF in accordance with a gate signal G3 to be described below, and the fourth switching element 134 is controlled to switch ON and OFF in accordance with a gate signal G4 to be described below.

Note that a combination of an insulated gate bipolar transistor (IGBT) that switches ON when the gate signal is High and an anti-parallel diode, for example, is used as the first switching element 131, the second switching element 132, the third switching element 133, and the fourth switching element 134.

The first switching element 131 is connected at one end to the connection portion C3 and at the other end to the terminal T1. The second switching element 132 is connected at one end to the connection portion C3 and at the other end to the connection portion C2. The third switching element 133 is connected at one end to the connection portion C2 and at another end to the connection portion C4. The fourth switching element 134 is connected at one end to the connection portion C4 and at another end to the terminal T4.

More specifically, the emitter terminal of the first switching element 131 is connected to the terminal T1, and the collector terminal of the second switching element 132 is connected to the reactor 12 via the connection portion C2. An emitter terminal of the third switching element 133 is connected to the reactor 12 via the connection portion C2, and a collector terminal of the fourth switching element 134 is connected to the terminal T4. The collector terminal of the second switching element 132 and an emitter terminal of the third switching 133 are connected to the connection portion C2. The connection portion C2 is connected to the terminal T2 via the reactor 12.

The voltage detector 24 detects a voltage between the connection portion C3 and the connection portion C4, or in other words a charging/discharging capacitor voltage Vcf serving as an inter-terminal voltage of the charging/discharging capacitor 15, as an intermediate value of the inter-terminal voltage of the high voltage side smoothing capacitor 14, and outputs the detected charging/discharging capacitor voltage Vcf to the control apparatus 30.

The control apparatus 30 performs control to switch the first switching element 131, the second switching element 132, the third switching element 133, and the fourth switching element 134 ON and OFF. More specifically, the control apparatus 30 generates the gate signal G1 for the first switching element 131, the gate signal G2 for the second switching element 132, the gate signal G3 for the third switching element 133, and the gate signal G4 for the fourth switching element 134 in accordance with respective detection values obtained by the low voltage side voltage detector 21, the current detector 22, the high voltage side voltage detector 23, and the voltage detector 24.

Figure 11:
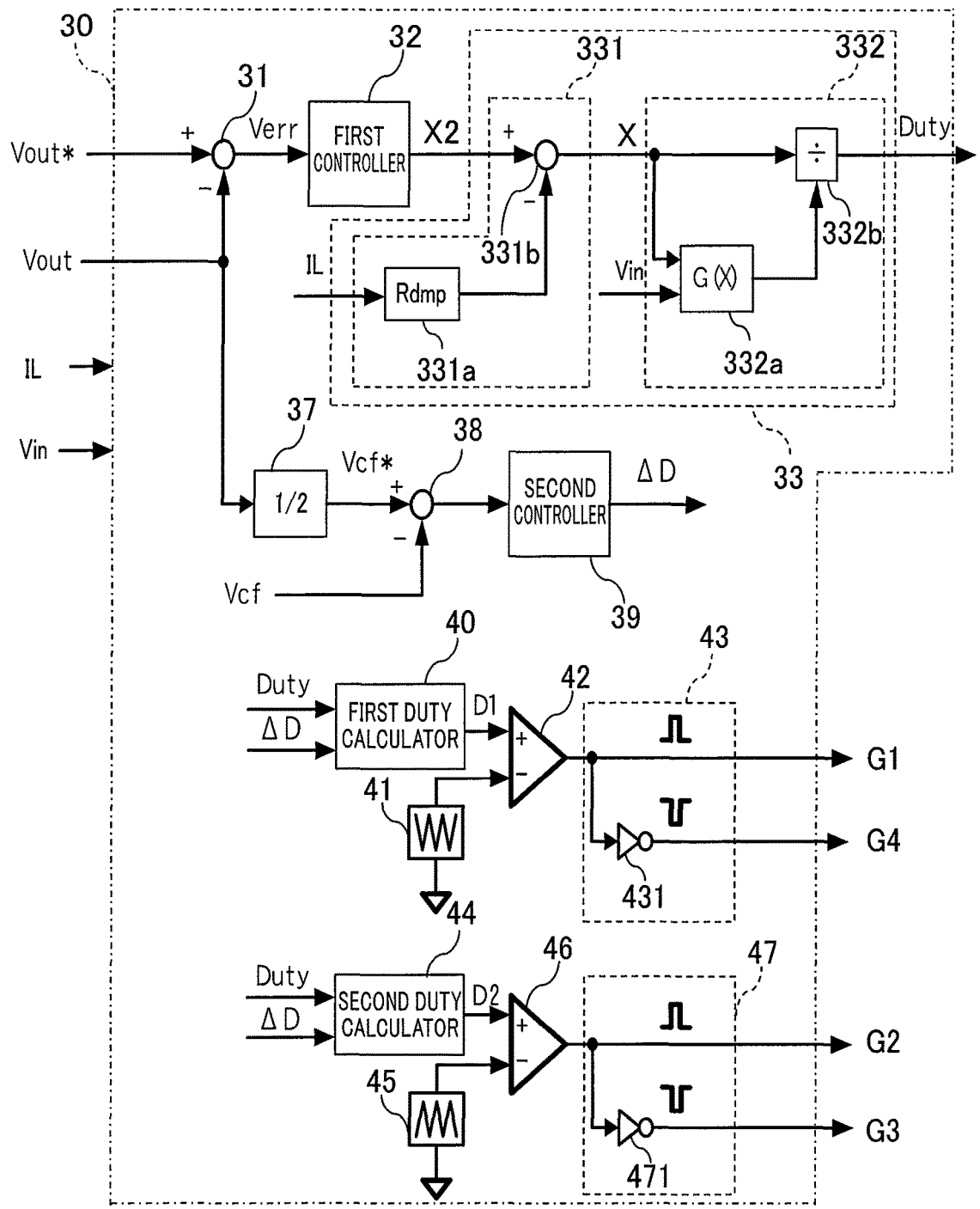
FIG. 11 is a view showing a configuration of a control apparatus for a DC/DC converter according to the second embodiment of this invention.

Next, a configuration of the control apparatus 30 according to the second embodiment will be described with reference to FIG. 11. FIG. 11 is a view showing the configuration of the control apparatus 30 for a DC/DC converter according to the second embodiment of this invention. The control apparatus 30 shown in FIG. 11 includes the subtractor 31, the first controller 32, the calculator 33, a multiplier 37, a subtractor 38, a second controller 39, a first Duty calculator 40, a triangular waveform generator 41, a comparator 42, a gate signal outputter 43, a second Duty calculator 44, a triangular waveform generator 45, a comparator 46, and a gate signal outputter 47.

Here, the control apparatus according to the second embodiment is configured to control the output voltage Vout to the target output voltage Vout*, and to control the charging/discharging capacitor voltage Vcf to half the value of the output voltage Vout. With this configuration, a ripple in the reactor current IL flowing through the reactor 12 can be reduced.

The subtractor 31, the first controller 32, and the calculator 33 perform similar operations to the first embodiment, as a result of which the control calculation value is output. The control calculation value is then input into the first Duty calculator 40 and the second Duty calculator 44, respectively. Note that in the second embodiment, similarly to the first embodiment, a case in which Duty is output as the control calculation value and input into the first Duty calculator 40 and the second Duty calculator 44, respectively, will be described as an example.

The multiplier 37 multiplies the output voltage Vout input from the high voltage side voltage detector 23 by half, and outputs a resulting multiplication value to the subtractor 38 as a target charging/discharging capacitor voltage Vcf*.

The subtractor 38 calculates a difference between the target charging/discharging capacitor voltage Vcf* input from the multiplier 37 and the charging/discharging capacitor voltage Vcf input from the voltage detector 24 as a differential voltage, and outputs the calculated differential voltage to the second controller 39.

The second controller 39 calculates a calculation value ΔD using the differential voltage calculated by the subtractor 38 as input in accordance with a specific control method such as PI control, P control, or PID control, and outputs the calculated calculation value ΔD to the first Duty calculator 40 and the second Duty calculator 44. Note that the calculation value ΔD is calculated so as to align the charging/discharging capacitor voltage Vcf with the target charging/discharging capacitor voltage Vcf*.

The first Duty calculator 40 outputs to the comparator 42 a calculation value D1 that is adjusted using Duty and ΔD as input so that the output voltage Vout is aligned with the target output voltage Vout* and the charging/discharging capacitor voltage Vcf is aligned with the target charging/discharging capacitor voltage Vcf*.

The triangular waveform generator 41 generates a triangular waveform having a specific period, and outputs the generated triangular waveform to the comparator 42. The comparator 42 generates a pulse waveform by comparing the calculation value D1 input from the first Duty calculator 40 with the triangular waveform input from the triangular waveform generator 41.

The pulse waveform output from the comparator 42 forms the gate signal G1 as is on one side of the gate signal outputter 43, and passes through an inverter 431 on another side of the gate signal outputter 43 so as to form the gate signal G4, which has a complementary relationship to the gate signal G1. The gate signal outputter 43 then outputs the generated gate signals G1 and G4.

The second Duty calculator 44 outputs to the comparator 46 a calculation value D2 that is adjusted using Duty and ΔD as input so that the output voltage Vout is aligned with the target output voltage Vout* and the charging/discharging capacitor voltage Vcf is aligned with the target charging/discharging capacitor voltage Vcf*.

The triangular waveform generator 45 generates a triangular waveform having a specific period and a phase that deviates by 180 degrees from the phase of the triangular waveform having a specific period generated by the triangular waveform generator 41, and outputs the generated triangular waveform to the comparator 46. The comparator 46 generates a pulse waveform by comparing the calculation value D2 input from the second Duty calculator 44 with the triangular waveform input from the triangular waveform generator 45.

The pulse waveform output from the comparator 46 forms the gate signal G2 as is on one side of the gate signal outputter 47, and passes through an inverter 471 on another side of the gate signal outputter 47 so as to form the gate signal G3, which has a complementary relationship to the gate signal G2. The gate signal outputter 47 then outputs the generated gate signals G2 and G3.

Next, operations performed by the DC/DC converter according to the second embodiment in a steady state will be described with reference to FIGS. 12A to 12D. FIGS. 12A to 12D are illustrative views showing operation modes of the DC/DC converter according to the second embodiment of this invention.

Note that here, a steady state is a state in which the output voltage Vout is obtained with stability by controlling the respective switching elements 131 to 134 to switch ON and OFF. Further, the DC/DC converter has two operation states, namely a state in which the motor 2 is driven by supplying power to the motor 2 from the battery 1, or in other words a power running operation, and a state in which the motor 2 generates power and the power generated by the motor 2 is supplied to the battery 1, or in other words a regenerative operation.

Here, as shown in FIGS. 12A to 12D, four modes, namely mode 1 to mode 4, are provided as the operation modes of the DC/DC converter in a steady state.

Figure 12A:
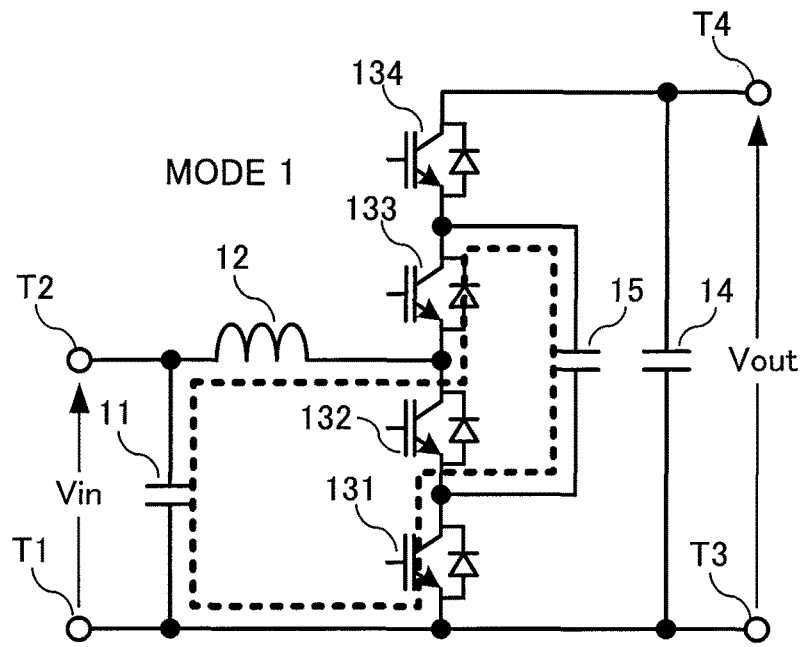
FIG. 12A is an illustrative view showing an operation mode of the DC/DC converter according to the second embodiment of this invention.

In mode 1, as shown in FIG. 12A, the switching elements 131, 133 are ON and the switching elements 132, 134 are OFF. Further, in mode 1, energy is stored in the charging/discharging capacitor 15 during a power running operation, and energy is discharged from the charging/discharging capacitor 15 during a regenerative operation.

Figure 12B:
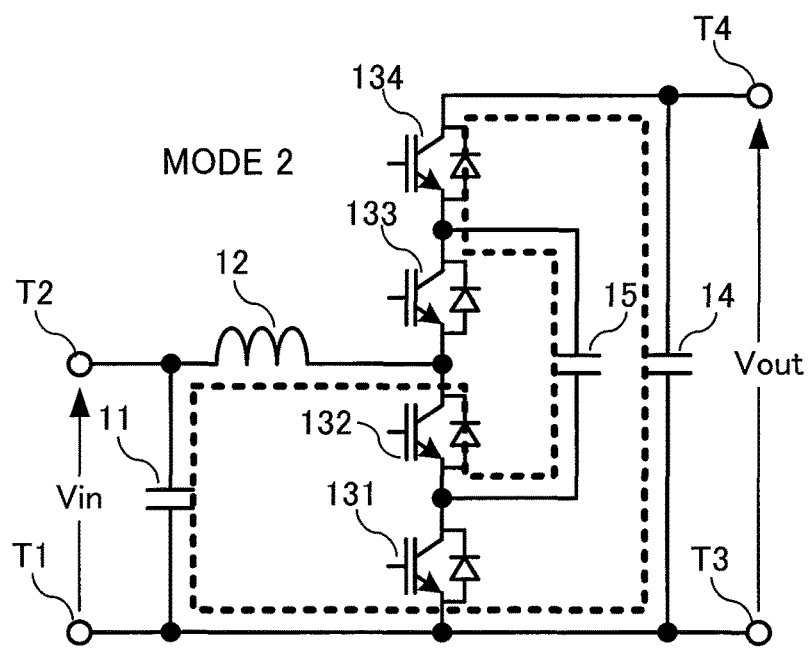
FIG. 12B is an illustrative view showing an operation mode of the DC/DC converter according to the second embodiment of this invention.

In mode 2, as shown in FIG. 12B, the switching elements 131, 133 are OFF and the switching elements 132, 134 are ON. Further, in mode 2, energy is discharged from the charging/discharging capacitor 15 during a power running operation, and energy is stored in the charging/discharging capacitor 15 during a regenerative operation.

Figure 12C:
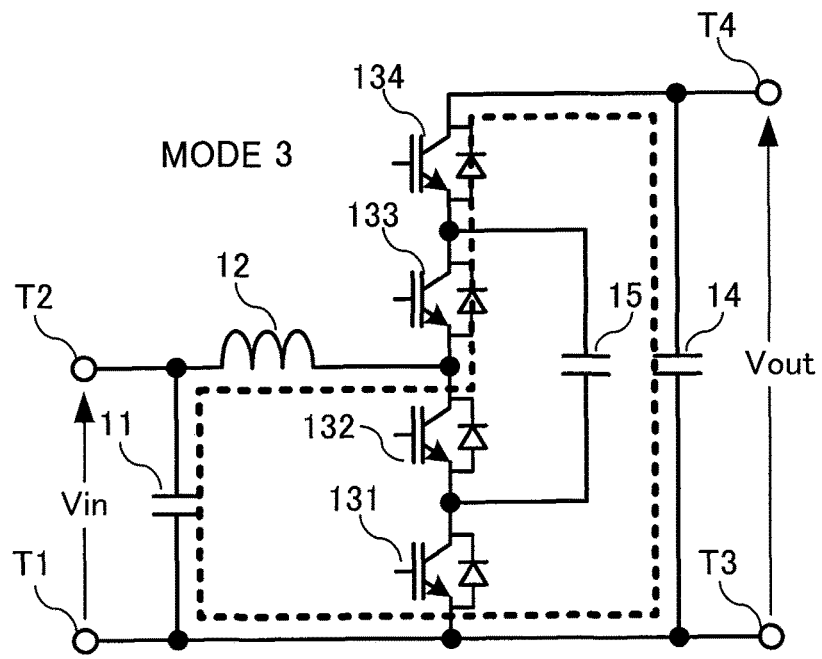
FIG. 12C is an illustrative view showing an operation mode of the DC/DC converter according to the second embodiment of this invention.

In mode 3, as shown in FIG. 12C, the switching elements 131, 132 are OFF and the switching elements 133, 134 are ON. Further, in mode 3, energy is discharged from the reactor 12 during a power running operation, and energy is stored in the reactor 12 during a regenerative operation.

Figure 12D:
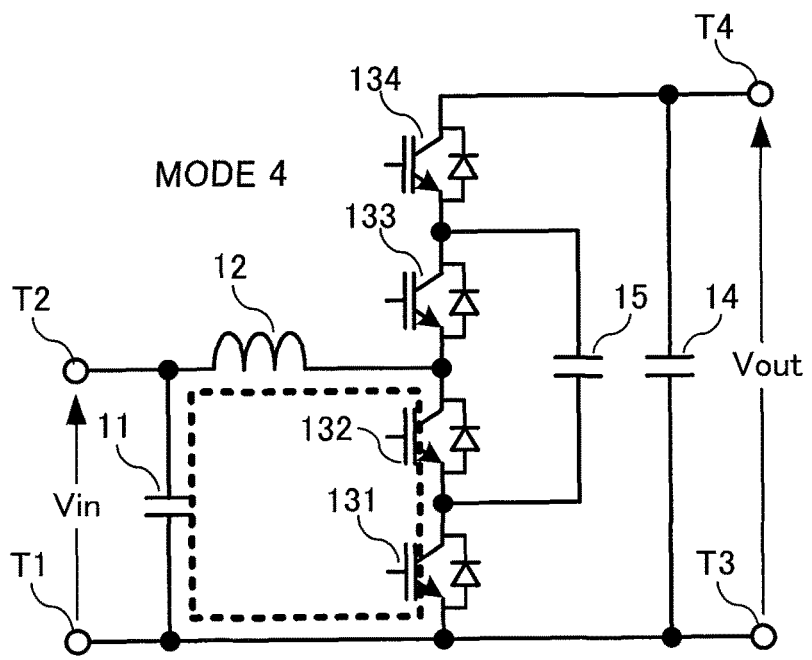
FIG. 12D is an illustrative view showing an operation mode of the DC/DC converter according to the second embodiment of this invention.

In mode 4, as shown in FIG. 12D, the switching elements 131, 132 are ON and the switching elements 133, 134 are OFF. Further, in mode 4, energy is stored in the reactor 12 during a power running operation, and energy is discharged from the reactor 12 during a regenerative operation.

By appropriately adjusting time ratios of the respective operation modes, the input voltage Vin input between the terminal T1 and the terminal T2 can be boosted to a desired voltage, and the boosted voltage can be output between the terminal T3 and the terminal T4 as the output voltage Vout.

Here, the operation performed by the DC/DC converter according to the second embodiment in the steady state differs depending on whether or not a boost ratio N by which the output voltage Vout is boosted relative to the input voltage Vin equals or exceeds 2. Accordingly, operations performed by the DC/DC converter in the steady state when the boost ratio N is smaller than 2 and when the boost ratio N equals or exceeds 2 will be described separately below with reference to FIGS. 13 to 16. FIGS. 13 to 16 are illustrative views showing operations of the DC/DC converter according to the second embodiment of this invention.

First, a case in which the operation state of the DC/DC converter corresponds to the power running operation and the boost ratio N is smaller than 2 will be described with reference to FIG. 13.

Figure 13:
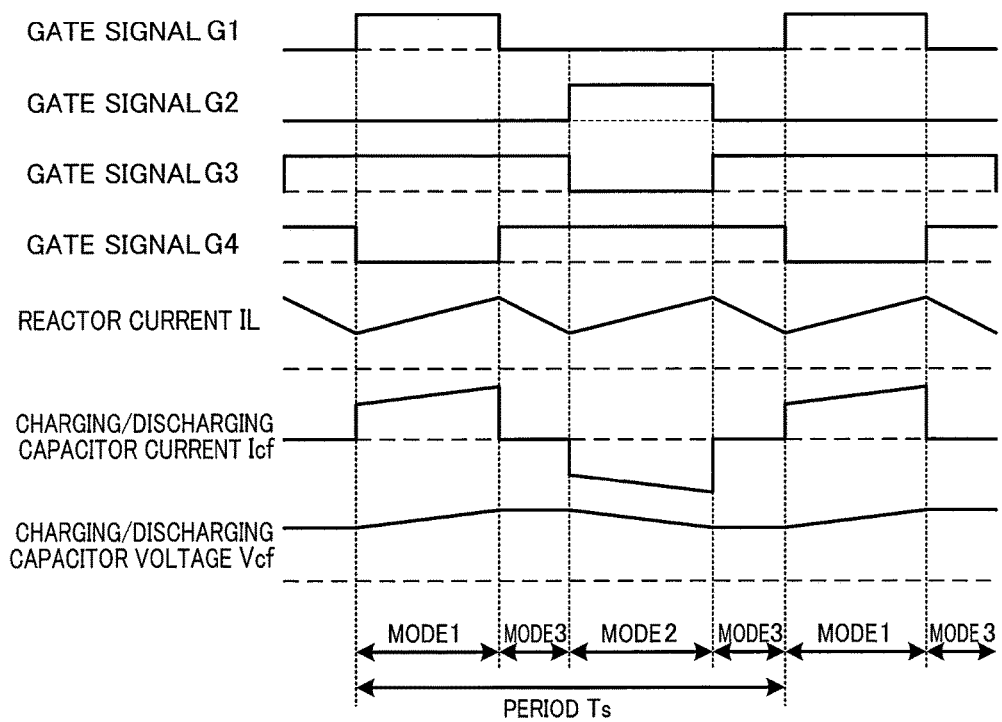
FIG. 13 is an illustrative view showing an operation of the DC/DC converter according to the second embodiment of this invention.

FIG. 13 shows waveforms of the gate signals G1 to G4 relating to the respective switching elements 131 to 134, a waveform of the reactor current IL, a waveform of a charging/discharging capacitor current Icf, which is a current flowing through the charging/discharging capacitor 15, and a waveform of the charging/discharging capacitor voltage Vcf. Note that the waveforms shown in FIG. 13 are waveforms that can be obtained when the boost ratio N is smaller than 2.

Further, in the steady state, the charging/discharging capacitor voltage Vcf is controlled to half the value of the output voltage Vout, and therefore a magnitude relationship between the input voltage Vin, the output voltage Vout, and the charging/discharging capacitor voltage Vcf satisfies a following relationship.

$$Vout > Vin > Vcf$$

When the gate signals G1, G3 relating respectively to the first switching element 131 and the third switching element 133 are at High and the gate signals G2, G4 relating respectively to the second switching element 132 and the fourth switching element 134 are at Low, or in other words in mode 1, the switching elements 131, 133 switch ON and the switching elements 132, 134 switch OFF. Accordingly, energy travels along a following path from the low voltage side smoothing capacitor 11 to the reactor 12 and the charging/discharging capacitor 15.

low voltage side smoothing capacitor 11→reactor 12→third switching element 133→charging/discharging capacitor 15→first switching element 131

Next, when the gate signals G1, G2 relating respectively to the first switching element 131 and the second switching element 132 are at Low and the gate signals G3, G4 relating respectively to the third switching element 133 and the fourth switching element 134 are at High, or in other words in mode 3, the switching elements 131, 132 switch OFF and the switching elements 133, 134 switch ON. Accordingly, the energy stored in the reactor 12 travels along a following path to the low voltage side smoothing capacitor 11 and the high voltage side smoothing capacitor 14.

low voltage side smoothing capacitor 11→reactor 12→third switching element 133→fourth switching element 134→high voltage side smoothing capacitor 14

Next, when the gate signals G1, G3 relating respectively to the first switching element 131 and the third switching element 133 are at Low and the gate signals G2, G4 relating respectively to the second switching element 132 and the fourth switching element 134 are at High, or in other words in mode 2, the switching elements 131, 133 switch OFF and the switching elements 132, 134 switch ON. Accordingly, the energy stored in the charging/discharging capacitor 15 travels along a following path to the low voltage side smoothing capacitor 11 and the high voltage side smoothing capacitor 14, and energy is stored in the reactor 12.

low voltage side smoothing capacitor 11→reactor 12→second switching element 132→charging/discharging capacitor 15→fourth switching element 134→high voltage side smoothing capacitor 14

Next, when the gate signals G1, G2 relating respectively to the first switching element 131 and the second switching element 132 are at Low and the gate signals G3, G4 relating respectively to the third switching element 133 and the fourth switching element 134 are at High, or in other words in mode 3, the switching elements 131, 132 switch OFF and the switching elements 133, 134 switch ON. Accordingly, the energy stored in the reactor 12 travels along the following path to the low voltage side smoothing capacitor 11 and the high voltage side smoothing capacitor 14.

low voltage side smoothing capacitor 11→reactor 12→third switching element 133→fourth switching element 134→high voltage side smoothing capacitor 14

As shown in FIG. 13, the series of operations described above, i.e. a series of operations constituted by mode 1, mode 3, mode 2, and mode 3, is repeated at intervals of a period Ts. As a result, the input voltage Vin input between the terminal T1 and the terminal T2 can be boosted from 1 to a desired voltage at the boost ratio N that is smaller than 2, whereupon the boosted voltage can be output between the terminal T3 and the terminal T4 as the output voltage Vout while supplying energy from the battery 1 to the motor 2.

Next, a case in which the operation state of the DC/DC converter corresponds to the power running operation and the boost ratio N equals or exceeds 2 will be described with reference to FIG. 14.

Figure 14:
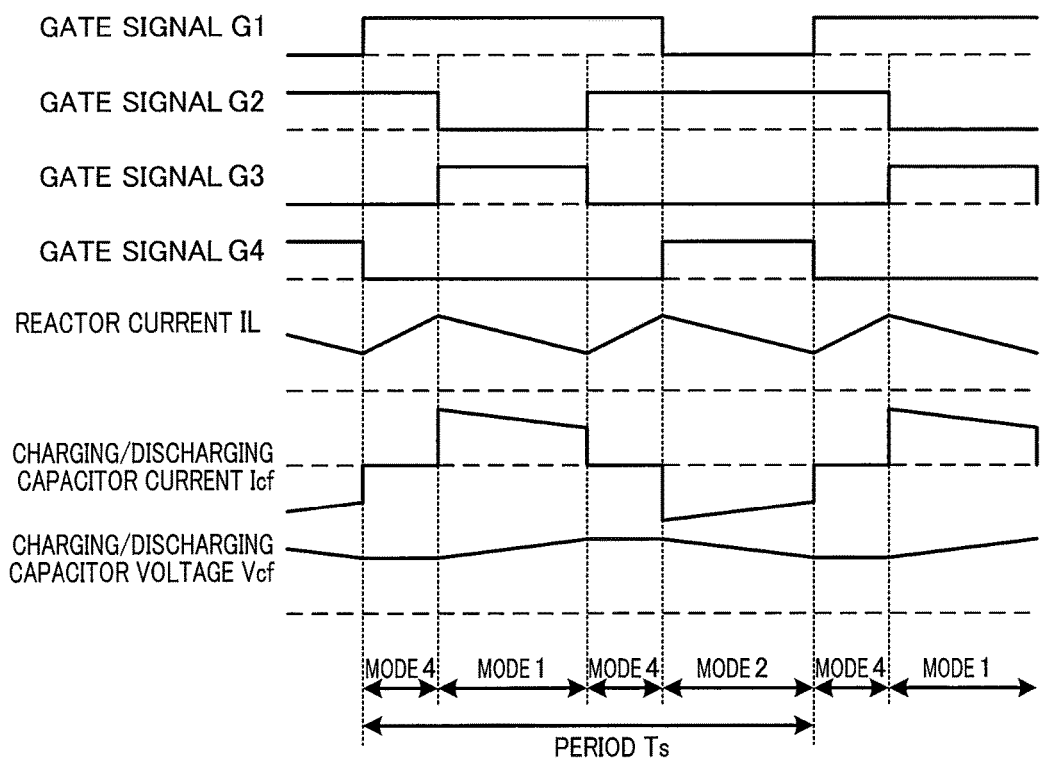
FIG. 14 is an illustrative view showing an operation of the DC/DC converter according to the second embodiment of this invention.

FIG. 14 shows the waveforms of the gate signals G1 to G4, the waveform of the reactor current IL, the waveform of the charging/discharging capacitor current Icf, and the waveform of the charging/discharging capacitor voltage Vcf. Note that the waveforms shown in FIG. 14 are waveforms that can be obtained when the boost ratio N equals or exceeds 2.

Further, in the steady state, the charging/discharging capacitor voltage Vcf is controlled to half the value of the output voltage Vout, and therefore the magnitude relationship between the input voltage Vin, the output voltage Vout, and the charging/discharging capacitor voltage Vcf satisfies a following relationship.

$$Vout > Vcf > Vin$$

When the gate signals G1, G2 relating respectively to the first switching element 131 and the second switching element 132 are at High and the gate signals G3, G4 relating respectively to the third switching element 133 and the fourth switching element 134 are at Low, or in other words in mode 4, the switching elements 131, 132 switch ON and the switching elements 133, 134 switch OFF. Accordingly, energy travels along a following path from the low voltage side smoothing capacitor 11 to the reactor 12.

low voltage side smoothing capacitor 11→reactor 12→second switching element 132→first switching element 131

Next, when the gate signals G1, G3 relating respectively to the first switching element 131 and the third switching element 133 are at High and the gate signals G2, G4 relating respectively to the second switching element 132 and the fourth switching element 134 are at Low, or in other words in mode 1, the switching elements 131, 133 switch ON and the switching elements 132, 134 switch OFF. Accordingly, the energy stored in the reactor 12 travels along the following path to the low voltage side smoothing capacitor 11 and the charging/discharging capacitor 15.

low voltage side smoothing capacitor 11→reactor 12→third switching element 133→charging/discharging capacitor 15→first switching element 131

Next, when the gate signals G1, G2 relating respectively to the first switching element 131 and the second switching element 132 are at High and the gate signals G3, G4 relating respectively to the third switching element 133 and the fourth switching element 134 are at Low, or in other words in mode 4, the switching elements 131, 132 switch ON and the switching elements 133, 134 switch OFF. Accordingly, energy travels along the following path from the low voltage side smoothing capacitor 11 to the reactor 12.

low voltage side smoothing capacitor 11→reactor 12→second switching element 132→first switching element 131

Next, when the gate signals G1, G3 relating respectively to the first switching element 131 and the third switching element 133 are at Low and the gate signals G2, G4 relating respectively to the second switching element 132 and the fourth switching element 134 are at High, or in other words in mode 2, the switching elements 131, 133 switch OFF and the switching elements 132, 134 switch ON. Accordingly, the energy stored in the reactor 12 and the charging/discharging capacitor 15 travels along the following path to the low voltage side smoothing capacitor 11 and the high voltage side smoothing capacitor 14.

low voltage side smoothing capacitor 11→reactor 12→second switching element 132→charging/discharging capacitor 15→fourth switching element 134→high voltage side smoothing capacitor 14

As shown in FIG. 14, the series of operations described above, i.e. a series of operations constituted by mode 4, mode 1, mode 4, and mode 2, is repeated at intervals of the period Ts. As a result, the input voltage Vin input between the terminal T1 and the terminal T2 can be boosted to a desired voltage at the boost ratio N that equals or exceeds 2, whereupon the boosted voltage can be output between the terminal T3 and the terminal T4 as the output voltage Vout while supplying energy from the battery 1 to the motor 2.

Next, a case in which the operation state of the DC/DC converter corresponds to the regenerative operation and the boost ratio N is smaller than 2 will be described with reference to FIG. 15.

Figure 15:
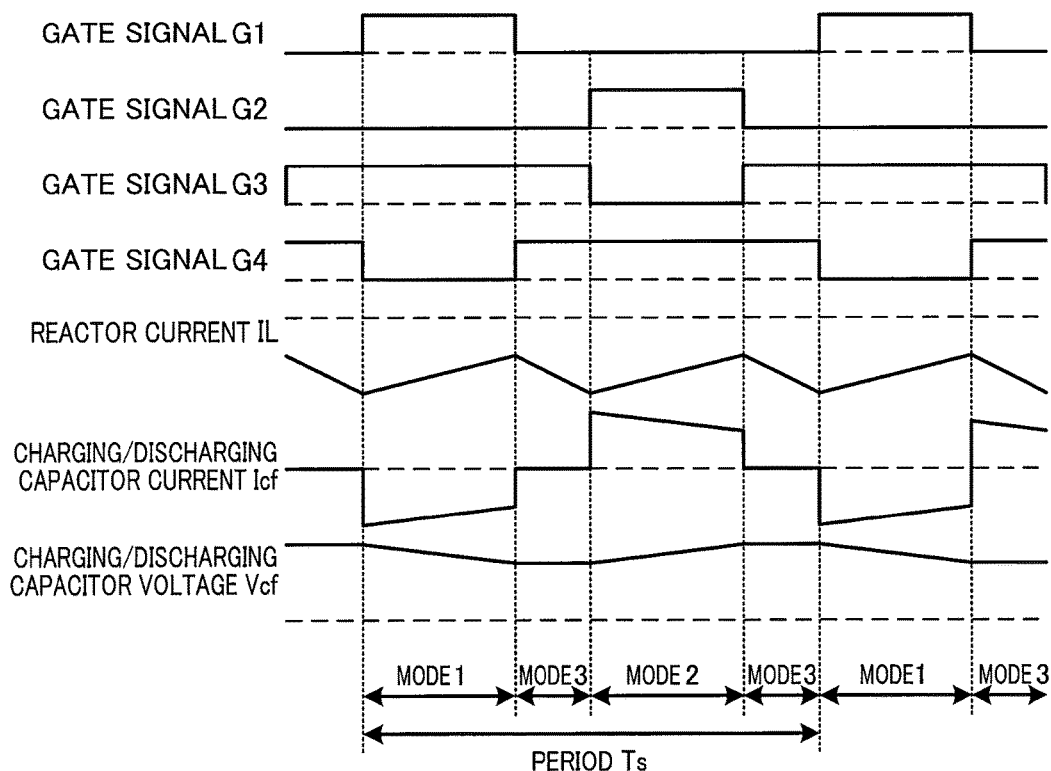
FIG. 15 is an illustrative view showing an operation of the DC/DC converter according to the second embodiment of this invention.

FIG. 15 shows the waveforms of the gate signals G1 to G4, the waveform of the reactor current IL, the waveform of the charging/discharging capacitor current Icf, and the waveform of the charging/discharging capacitor voltage Vcf.

Note that the waveforms shown in FIG. 15 are waveforms that can be obtained when the boost ratio N is smaller than 2.

Further, in the steady state, the charging/discharging capacitor voltage Vcf is controlled to half the value of the output voltage Vout, and therefore the magnitude relationship between the input voltage Vin, the output voltage Vout, and the charging/discharging capacitor voltage Vcf satisfies the following relationship.

Vout>Vin>Vcf

When the gate signals G1, G3 relating respectively to the first switching element 131 and the third switching element 133 are at High and the gate signals G2, G4 relating respectively to the second switching element 132 and the fourth switching element 134 are at Low, or in other words in mode 1, the switching elements 131, 133 switch ON and the switching elements 132, 134 switch OFF. Accordingly, energy travels along a following path from the charging/discharging capacitor 15 and the reactor 12 to the low voltage side smoothing capacitor 11.

low voltage side smoothing capacitor 11←reactor 12←third switching element 133←charging/discharging capacitor 15←first switching element 131

Next, when the gate signals G1, G2 relating respectively to the first switching element 131 and the second switching element 132 are at Low and the gate signals G3, G4 relating respectively to the third switching element 133 and the fourth switching element 134 are at High, or in other words in mode 3, the switching elements 131, 132 switch OFF and the switching elements 133, 134 switch ON. Accordingly, energy travels along a following path from the high voltage side smoothing capacitor 14 to the reactor 12 and the low voltage side smoothing capacitor 11.

low voltage side smoothing capacitor 11←reactor 12←third switching element 133←fourth switching element 134←high voltage side smoothing capacitor 14

Next, when the gate signals G1, G3 relating respectively to the first switching element 131 and the third switching element 133 are at Low and the gate signals G2, G4 relating respectively to the second switching element 132 and the fourth switching element 134 are at High, or in other words in mode 2, the switching elements 131, 133 switch OFF and the switching elements 132, 134 switch ON. Accordingly, energy travels along a following path from the high voltage side smoothing capacitor 14 and the reactor 12 to the charging/discharging capacitor 15 and the low voltage side smoothing capacitor 11.

low voltage side smoothing capacitor 11←reactor 12←second switching element 132←charging/discharging capacitor 15←fourth switching element 134←high voltage side smoothing capacitor 14

Next, when the gate signals G1, G2 relating respectively to the first switching element 131 and the second switching element 132 are at Low and the gate signals G3, G4 relating respectively to the third switching element 133 and the fourth switching element 134 are at High, or in other words in mode 3, the switching elements 131, 132 switch OFF and the switching elements 133, 134 switch ON. Accordingly, energy travels along the following path from the high voltage side smoothing capacitor 14 to the reactor 12 and the low voltage side smoothing capacitor 11.

low voltage side smoothing capacitor 11←reactor 12←third switching element 133←fourth switching element 134←high voltage side smoothing capacitor 14

As shown in FIG. 15, the series of operations described above, i.e. a series of operations constituted by mode 1, mode 3, mode 2, and mode 3, is repeated at intervals of the period Ts. As a result, the input voltage Vin input between the terminal T1 and the terminal T2 can be boosted from 1 to a desired voltage at the boost ratio N that is smaller than 2, whereupon the boosted voltage can be output between the terminal T3 and the terminal T4 as the output voltage Vout while storing energy generated by the motor 2 in the battery 1.

Next, a case in which the operation state of the DC/DC converter corresponds to the regenerative operation and the boost ratio N equals or exceeds 2 will be described with reference to FIG. 16.

Figure 16:
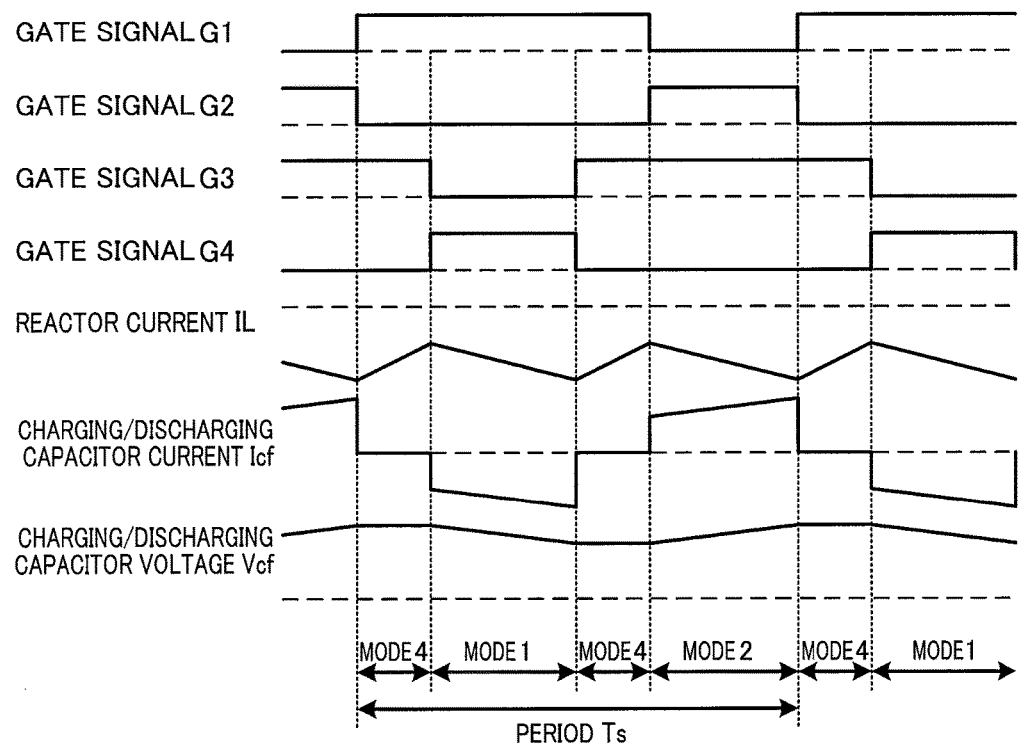
FIG. 16 is an illustrative view showing an operation of the DC/DC converter according to the second embodiment of this invention.

FIG. 16 shows the waveforms of the gate signals G1 to G4, the waveform of the reactor current IL, the waveform of the charging/discharging capacitor current Icf, and the waveform of the charging/discharging capacitor voltage Vcf. Note that the waveforms shown in FIG. 16 are waveforms that can be obtained when the boost ratio N equals or exceeds 2.

Further, in the steady state, the charging/discharging capacitor voltage Vcf is controlled to half the value of the output voltage Vout, and therefore the magnitude relationship between the input voltage Vin, the output voltage Vout, and the charging/discharging capacitor voltage Vcf satisfies the following relationship.

Vout>Vcf>Vin

When the gate signals G1, G2 relating respectively to the first switching element 131 and the second switching element 132 are at High and the gate signals G3, G4 relating respectively to the third switching element 133 and the fourth switching element 134 are at Low, or in other words in mode 4, the switching elements 131, 132 switch ON and the switching elements 133, 134 switch OFF. Accordingly, energy travels along a following path from the reactor 12 to the low voltage side smoothing capacitor 11.

low voltage side smoothing capacitor 11←reactor 12←second switching element 132←first switching element 131

Next, when the gate signals G1, G3 relating respectively to the first switching element 131 and the third switching element 133 are at High and the gate signals G2, G4 relating respectively to the second switching element 132 and the fourth switching element 134 are at Low, or in other words in mode 1, the switching elements 131, 133 switch ON and the switching elements 132, 134 switch OFF. Accordingly, energy travels along the following path from the charging/discharging capacitor 15 to the reactor 12 and the low voltage side smoothing capacitor 11.

low voltage side smoothing capacitor 11←reactor 12←third switching element 133←charging/discharging capacitor 15←first switching element 131

Next, when the gate signals G1, G2 relating respectively to the first switching element 131 and the second switching element 132 are at High and the gate signals G3, G4 relating respectively to the third switching element 133 and the fourth switching element 134 are at Low, or in other words in mode 4, the switching elements 131, 132 switch ON and the switching elements 133, 134 switch OFF. Accordingly, energy travels along the following path from the reactor 12 to the low voltage side smoothing capacitor 11.

low voltage side smoothing capacitor 11←reactor 12←second switching element 132←first switching element 131

Next, when the gate signals G1, G3 relating respectively to the first switching element 131 and the third switching element 133 are at Low and the gate signals G2, G4 relating respectively to the second switching element 132 and the fourth switching element 134 are at High, or in other words in mode 2, the switching elements 131, 133 switch OFF and the switching elements 132, 134 switch ON. Accordingly, energy travels along a following path from the high voltage side smoothing capacitor 14 to the reactor 12, the charging/discharging capacitor 15, and the low voltage side smoothing capacitor 11.

low voltage side smoothing capacitor 11←reactor 12←second switching element 132←charging/discharging capacitor 15←fourth switching element 134←high voltage side smoothing capacitor 14

As shown in FIG. 16, the series of operations described above, i.e. a series of operations constituted by mode 4, mode 1, mode 4, and mode 2, is repeated at intervals of the period Ts. As a result, the input voltage Vin input between the terminal T1 and the terminal T2 can be boosted to a desired voltage at the boost ratio N that equals or exceeds 2, whereupon the boosted voltage can be output between the terminal T3 and the terminal T4 as the output voltage Vout while storing energy generated by the motor 2 in the battery 1.

Next, amounts of variation in the output voltage Vout and the reactor current IL when Duty is adjusted by the control apparatus 30 will be described.

In an ideal state where the values calculated by the control apparatus 30 are reflected as is in the respective ON periods of the switching elements 131 to 134, the ON ratio of the first switching element 131 corresponds to D1, the ON ratio of the fourth switching element 134 corresponds to (1−D1), the ON ratio of the second switching element 132 corresponds to D2, and the ON ratio of the third switching element 133 corresponds to (1−D2).

Here, when the amount of current flowing towards the motor 2 is set as Io, the capacitance of the high voltage side smoothing capacitor 14 is set as Co, and the inductance of the reactor 12 is set as L, a state-space averaging equation of the power conversion circuit 10 may be expressed as shown below in Equation (9).

[Math. 9]

$$\frac{d}{dt}\begin{bmatrix} Vout \\ IL \\ Vcf \end{bmatrix} = \begin{bmatrix} 0 & 0 & \frac{1-D1}{Co} \\ -\frac{1-D1}{L} & 0 & \frac{D2-D1}{L} \\ 0 & \frac{D1-D2}{Cf} & 0 \end{bmatrix} \begin{bmatrix} Vout \\ IL \\ Vcf \end{bmatrix} + \begin{bmatrix} -\frac{Io}{Co} \\ \frac{Vin}{L} \\ 0 \end{bmatrix} \quad (9)$$

In the steady state, the left side of Equation (9)=0, and therefore Equations (10) to (12), shown below, are obtained. It can be seen that in the steady state, the output voltage Vout and the charging/discharging capacitor voltage Vcf ideally converge on a fixed value when the ON duty D1 and the ON duty D2 are made equal.

$$Vout/Vin = 1/(1-D1) \quad (10)$$

$$IL = Io/(1-D1) \quad (11)$$

$$D1 = D2 \quad (12)$$

When Equation (12) is inserted into Equation (9), the resulting equation takes a similar form to Equation (3), described in the first embodiment. In other words, in the steady state, identical characteristics are obtained in relation to the power conversion circuit 10 according to the first embodiment and the power conversion circuit 10 according to the second embodiment. Therefore, by configuring the control apparatus 30 to include the resonance suppression unit 331 and the gain normalization unit 332, similarly to the first embodiment, similar effects to the first embodiment are obtained.

According to the second embodiment, as described above, this invention can be applied likewise to the power conversion circuit 10 having an MLC circuit configuration, and in so doing, similar effects to the first embodiment are obtained.

Note that in the first and second embodiments, described above, the switching elements 131 to 134 are formed using IGBTs, but the switching elements 131 to 134 may be formed using MOSFETs, JFETs, and so on. Moreover, the switching elements and diode elements may be formed using wide bandgap semiconductors having a larger bandgap than silicon semiconductors. Silicon carbide (SiC), gallium nitride-based materials, and diamond may be cited as examples of wide bandgap semiconductor materials.

Switching elements and diode elements formed from wide bandgap semiconductors exhibit superior voltage resistance and a high allowable current density, and therefore the switching element and the diode element can be reduced in size. Further, by employing small switching elements and diode elements, a semiconductor module incorporating these elements can be reduced in size. Furthermore, these switching elements and diode elements exhibit superior heat resistance, and therefore heat dissipating fins of a heat sink can be reduced in size and a water-cooled portion can be cooled by air instead. As a result, the size of the semiconductor module can be reduced even further. Moreover, power loss is low, and therefore the efficiency of the switching elements and diode elements can be improved, leading to an improvement in the efficiency of the semiconductor module. Furthermore, wide bandgap semiconductors may be used to form both the switching element and the diode element, or to form either one thereof. Likewise with this configuration, the effects described above in the first and second embodiments can be obtained.

Further, this invention is not limited to the power conversion circuit 10 according to the first and second embodiments, described above, and similar effects can be obtained by applying this invention to another circuit configuration having a similar transfer characteristic. Moreover, the first and second embodiments of this invention may be freely combined within the scope of the invention, and may also be modified or omitted as appropriate.

What is claimed is:

1. A control apparatus for a DC/DC converter including: a power conversion circuit that includes a reactor connected at one end to a direct current power supply and a switching circuit configured to include a plurality of switching elements and connected to another end of the reactor, and that converts an input voltage input from the direct current power supply and outputs the converted input voltage as an output voltage; a low voltage side voltage detector that detects and outputs the input voltage; and a high voltage side voltage detector that detects and outputs the output voltage, the control apparatus performing control using a control calculation value to switch the plurality of switching elements ON and OFF, the control apparatus comprising:

a controller that calculates and outputs a first calculation value in accordance with a specific control method using, as input, a differential voltage between a target output voltage and the output voltage output from the high voltage side voltage detector; and a calculator that calculates the control calculation value from the first calculation value output from the controller and the input voltage output from the low voltage side voltage detector, wherein the calculator calculates an added value by adding the first calculation value output from the controller to the input voltage output from the low voltage side voltage detector, and calculates a value obtained by dividing the first calculation value by the added value as the control calculation value.

2. The control apparatus for a DC/DC converter according to claim 1, wherein the switching circuit is configured to include a first switching element and a second switching element connected in series with the first switching element, and the other end of the reactor is connected to a connection portion between the first switching element and the second switching element.

3. The control apparatus for a DC/DC converter according to claim 1, wherein the switching circuit is configured to include a first switching element, a second switching element connected in series with the first switching element, a third switching element connected in series with the second switching element, and a fourth switching element connected in series with the third switching element, the power conversion circuit further includes a capacitor connected in parallel with the second switching element and the third switching element, the second switching element and the third switching element being connected in series, and the other end of the reactor is connected to a connection portion between the second switching element and the third switching element.

4. The control apparatus for a DC/DC converter according to claim 1, wherein the specific control method is PI control, and a crossover frequency of the PI control is set at a frequency not exceeding a resonance point of the power conversion circuit.

5. The control apparatus for a DC/DC converter according to claim 1, wherein the specific control method is PI control, P control, PD control, or PID control.

6. The control apparatus for a DC/DC converter according to claim 1, wherein the plurality of switching elements respectively include semiconductor elements formed from wide bandgap semiconductors.

7. The control apparatus for a DC/DC converter according to claim 6, wherein the wide bandgap semiconductors are formed from silicon carbide, a gallium nitride-based material, or diamond.

8. A control apparatus for a DC/DC converter including: a power conversion circuit that includes a reactor connected at one end to a direct current power supply and a switching circuit configured to include a plurality of switching elements and connected to another end of the reactor, and that converts an input voltage input from the direct current power supply and outputs the converted input voltage as an output voltage; a low voltage side voltage detector that detects and outputs the input voltage; and a high voltage side voltage detector that detects and outputs the output voltage, the control apparatus performing control using a control calculation value to switch the plurality of switching elements ON and OFF, the control apparatus comprising:

a controller that calculates and outputs a first calculation value in accordance with a specific control method using, as input, a differential voltage between a target output voltage and the output voltage output from the high voltage side voltage detector; and a calculator that calculates the control calculation value from the first calculation value output from the controller and the input voltage output from the low voltage side voltage detector, wherein the DC/DC converter further includes a current detector that detects and outputs a reactor current flowing through the reactor, and the calculator:

calculates a value obtained by subtracting the reactor current, output from the current detector, from the first calculation value output from the controller as a second calculation value;

calculates an added value by adding the second calculation value to the input voltage output from the low voltage side voltage detector; and calculates a value obtained by dividing the second calculation value by the added value as the control calculation value.

9. A control apparatus for a DC/DC converter including: a power conversion circuit that includes a reactor connected at one end to a direct current power supply and a switching circuit configured to include a plurality of switching elements and connected to another end of the reactor, and that converts an input voltage input from the direct current power supply and outputs the converted input voltage as an output voltage; a low voltage side voltage detector that detects and outputs the input voltage; and a high voltage side voltage detector that detects and outputs the output voltage, the control apparatus performing control using a control calculation value to switch the plurality of switching elements ON and OFF, the control apparatus comprising:

a controller that calculates and outputs a first calculation value in accordance with a specific control method using, as input, a differential voltage between a target output voltage and the output voltage output from the high voltage side voltage detector; and a calculator that calculates the control calculation value from the first calculation value output from the controller and the input voltage output from the low voltage side voltage detector, wherein the DC/DC converter further includes a current detector that detects and outputs a reactor current flowing through the reactor, and the calculator:

calculates, as a second calculation value, a value obtained by subtracting, from the first calculation value output from the controller, a value obtained by multiplying the reactor current output from the current detector by a set constant;

calculates an added value by adding the second calculation value to the input voltage output from the low voltage side voltage detector; and calculates a value obtained by dividing the second calculation value by the added value as the control calculation value.

10. A control method for a DC/DC converter including: a power conversion circuit that includes a reactor connected at one end to a direct current power supply and a switching circuit configured to include a plurality of switching elements and connected to another end of the reactor, and that converts an input voltage input from the direct current power supply and outputs the converted input voltage as an output voltage; a low voltage side voltage detector that detects and outputs the input voltage; and a high voltage side voltage detector that detects and outputs the output voltage, control being performed using a control calculation value to switch the plurality of switching elements ON and OFF in the control method, the control method comprising the steps of:
calculating a first calculation value in accordance with a specific control method using, as input, a differential voltage between a target output voltage and the output voltage output from the high voltage side voltage detector;
calculating an added value by adding the first calculation value to the input voltage output from the low voltage side voltage detector; and
calculating the control calculation value by dividing the first calculation value by the added value.

* * * * *